United States Patent [19]
Zuev

[11] Patent Number: 5,695,665
[45] Date of Patent: Dec. 9, 1997

[54] SINGLE PASS ARC WELDING OF CONSIDERABLY THICK METALS USING INSULATED STATIONARY CONSUMABLE ELECTRODES

[75] Inventor: Igor Zuev, Moscow, Russian Federation

[73] Assignee: Russian American Technology Inventions LC, Sarasota, Fla.

[21] Appl. No.: 582,357

[22] Filed: Jan. 5, 1996

[51] Int. Cl.$^6$ .................................................... B23K 9/02
[52] U.S. Cl. .................................. 219/137 R; 219/125.1
[58] Field of Search ........................... 219/137 R, 125.1, 219/73.1

[56] References Cited

U.S. PATENT DOCUMENTS

| | | | |
|---|---|---|---|
| 2,948,805 | 8/1960 | Berg et al. | 219/137 R |
| 3,869,592 | 3/1975 | Paton et al. | 219/73.1 |
| 4,906,805 | 3/1990 | Rudd. | |

OTHER PUBLICATIONS

Development of Welding Engineering and Science Dealing with Welding, Processes, Welding Materials and Equipment. Welding in the USSR. vol. 1., Nauka Publishers, Moscow, 1981, pp. 292, 293.

Akoulov A.I., Belchuk G.A., Dimyantsevich, V.P., Process and Equipment for Fusion Welding, Mashinostroenie Publishers, Moscow, 1977, pp. 22, 23.

Process and Equipment for Fusion Welding, Nikiforov G.D., Bobrov G.V., Nikitin V.M., Dyachenko V.V., Mashinostroenie Publishers, Moscow, 1986, pp. 254–257.

Synergetics As A basis for Elaboration of Self Organizing Technologies if Treatment and Welding of Materials Using Concentrated Energy Fluxes, Igor Zuev, Issue #1 of the Russian scientific journal "Applied Physics," Spring, 1994.

Electric Arc Welding In A Narrow Gap In The Course of Arc Welding of Metals Using Stationary Consumable Electrodes, Igor Zuev, V. F. Kubarev, V. O. Bushma, R. V. Rodyakina, Issue #3, "Applied Physics," Fall, 1994.

Thermal Efficiency of Electron Beam Heating, Igor Zuev, R. V. Rodayakina, "Physics—Doklady," a journal of the Russian Academy of Sciences, Nov., 1994.

Self Organization (Synergetics) of welding and brazing processes. Work to perform a weld. By. Dr. I. V. Zuev, MEI—Technical University. The Russian magazine "Welding Production", Issue 9, 1995, ISSN 0491–6441.

Zuev et al., English translation of Soviet inventor's certificate No. SU1718465, Jan. 1987.

*Primary Examiner*—Clifford C. Shaw
*Attorney, Agent, or Firm*—William E. Mouzavires

[57] ABSTRACT

A welding method that permits thick pieces of metal to be welded together over the entire face of their touching surfaces during a process of self organizing, single pass arc welding in the ambient air without any special proofing of the welding bath melt. The higher quality and faster weld when welding considerably thick metals in a single pass is achieved by using an insulated stationary consumable electrode clamped between the parts to be welded together and by scientifically substantiated selection of the value of the electric power applied to the end face of the electrode.

The arc is distinguished by the fact that the value of its power is sustained at a level which keeps the pressure of the metal vapor $P_{me}$ which arises due to vaporization of the electrode material in the welding zone higher than the air pressure $P_{atm}$ with a relation between them complying with the rule $P_{me} \geq (1.1–2.0)P_{atm}$. This affords protection of the welding bath metal melt against air oxidation and interaction with other air elements such as N, H, $H_2O$, etc.

14 Claims, 5 Drawing Sheets

SINGLE PASS ARC WELDING OF CONSIDERABLY THICK METALS USING INSULATED STATIONARY CONSUMABLE ELECTRODES

FIELD OF THE INVENTION

The present invention involves methods and equipment applied in arc welding to weld together thick metal parts in a single pass.

BACKGROUND

DESCRIPTION OF PRIOR ART

There are many different, widely used methods and equipment for welding considerably thick parts. One method involves creating a slag bath in the space between the edges to be welded together and forming fixtures. One or more consumable electrodes, made in the form of wire or plates, are submerged in this slag bath. One pole of a direct current power source is connected to the parts of the article to be welded and the other pole to the consumable electrode which is submerged in the slag bath. Current flowing between the poles heats the slag bath up to the melting point of the electrode. The edges of the article's parts and the electrode are thus melted together. (Reference AR—Welding in the USSR, Vol. I. Development of Welding Engineering and Science Dealing With Welding. Processes and Welding Materials and Equipment. Nauka Publishers, Moscow, 1981, pp. 292–293)

Disadvantages of this method of welding include very high power consumption, low productivity, coarse grain structure of the metal of the weld and the heat affected zone, considerable width of the heat affected zone, and defects in the weld when welding medium alloy and high alloy steels.

A variant of the above mentioned method involves automatic arc welding carried out under a layer of flux with the edges of the parts to be welded preliminarily prepared by doing single-V butt grooves or double-V butt grooves, clamping the parts together with fixtures, putting a consumable electrode in the zone of welding, initiation of an arc between the electrode and the article, and successive feed of the electrode into the zone of welding as it is melted and the weld is grown. (Reference AR—Akoulov A. I., Belchuk G. A., Demyantsevich V. P.: Process and Equipment for Fusion Welding, Mashinostroyeniye Publishers, Moscow, 1977, pp. 22–23)

The variant described by Akoulov et al. is inefficient as it requires a labor consuming operation of preparing the edges. The "V" shaped edges additionally lead to an increase in the dimension of the weld. In addition, the process of filling the joint with consumable electrode material proceeds slowly because only 1 mm of the weld's depth is filled in a single pass. These problems become much more serious in the welding of large size articles when as many as several hundreds passes might be necessary to produce a weld.

The thyristor source of arc current for the above mentioned types of welding includes a multi phase power transformer, a power thyristor unit, a circuit for the phase control of the thyristors equipped with a resistor to adjust the value of load current, and a feed back unit. (Reference AT—Nikiforov G. D., Bobrov G. V., Nikitin V. M., Dyachenko V. V.: Process and Equipment for Fusion Welding, Mashinostroyeniye Publishers, Moscow, 1986, pp. 254–257)

Earlier arc welding processes were based on initiating an arc on the tip of a welding rod. The discovery of the basic principles of synergetics, the science of self-organizing of living and inanimate matter, elaborated by I. Prigozhin, G. Haken et al., made it possible to develop a new arc welding process using a flat-type electrode instead of a rod-type electrode. In this case, an arc initiated at some point on the flat type electrode's edge reciprocates along the electrode's edge at a frequency of 50–100 Hz by virtue of self organizing of the arcing process. The arc melts down the electrode material and throws it into the chamber prepared in advance when assembling the articles to be welded together. "As will be apparent from the description below in conjunction with the attached drawings, the term "self organizing" as used herein refers to the fact that the maintenance and travel of the arc along the electrode is self-sustaining or automatic in nature."

The method nearest, as to its engineering essence, to the invention offered here is the method of electric arc welding using an insulated stationary consumable electrode. The electrode is located between the article's parts to be welded together. The parts of the article and electrode are clamped together. Voltage is applied to the insulated electrode and to the parts of the article being welded promoting the emergence of arc current.

Standard equipment used in this process includes a clamping fixture in which the parts of the article to be welded are clamped together with an insulated stationary consumable electrode between them, a thyristor source of arc current equipped with a welding current controller and a circuit for the phase control of the thyristors. The leads of the thyristor source of arc current are connected to the insulated electrode and the article's parts to be welded. Dr. Igor Zuev, inventor of the subject invention of this application, is also the inventor of the invention covered by Certificate of the USSR No. SU 1718465 A1. (Method of Electric Arc Welding. Priority of Jan. 4, 1987, MK B 23 K 9/178.) A draw back of this method and the equipment is the presence of pores in the weld and sometimes a lack of fusion of the weld metal and the base metal as a consequence of the wrong choice of welding regimes.

SUMMARY OF THE PRESENT INVENTION

In accordance with the present invention, single pass arc welding of metals is carried out in ambient air oxidizing surroundings with the use of an insulated stationary consumable electrode put between the article's parts to be welded together. The parts of the article and the electrode are pressed together in a clamp (FIG. 5) and voltage is applied to the insulated stationary consumable electrode and to both parts of the article to be welded together, creating an arc current between the article and the electrode. This electric arc is distinguished by the fact that the value of its power is sustained at a level which keeps the pressure of the metal vapor $P_{me}$ which arises due to vaporization of the electrode material in the welding zone higher than the air pressure $P_{atm}$ with a relation between them complying with the formula $P_{me} \geq (1.1 \text{ to } 2.0) P_{atm}$ as later herein defined. This affords protection of the welding bath metal melt against air oxidation and interaction with other air elements such as N, H, $H_2O$, etc.

In the welding zone, simultaneously with the proofing of the metal melt against oxidation as per the previous paragraph, a required amount of metal vapor containing a sufficient level of ionization must be generated to sustain the stable arcing and reciprocating motion of the arc along the electrode's edge. In addition, the relation between the numerical values of the welding speed, the area of the electrode's cross section, the thermal properties of the materials to be welded together and the welding power is selected so that the value of this relation lies between 0.5 and 0.8 as per the following formula $$\frac{v_3 \cdot F \cdot S_{me}}{q} = 0.5 \text{ to } 0.8$$

and tends to maximum, where $v_3$ is the welding speed in cm/s, F is the area of the cross section of the end of the electrode measured in cm$^2$, $S_{me}$ is the heat content of the melted electrode measured in J/cm$^3$ and where q is the welding power measured in W and is determined by formula q=I·U, where in this formula I is the arc current measured in A and where u is the voltage of the arc measured in V.

DRAWINGS

FIG. 2 is a two dimensional schematic view in which you are looking, through one of the parts, at the consumable electrode. FIG. 2 illustrates the burning electric arc motion along the electrode's edge in accordance with the present invention.

DETAILED DESCRIPTION

In accordance with the present invention, self organizing, single pass arc welding of considerably thick metals is conducted in ambient air, either in the factory or in the field, without the special protection of the melted metal in the welding bath afforded by a flux or inert gasses, without enclosing this bath melt in a vacuum, or without any electrode coating previously required.

In this invention, self protection of the melted metal in the welding bath against air oxidation is achieved. The process creates positive pressure $P_{me}$ of the vapor of the vaporizing portion of the metal stationary consumable electrode that is greater than the ambient air pressure $P_{atm}$. This pressure is generated in the space of a narrow chamber (Number 5 on the Figures) with a volume of V=(d+2d$_1$)·b·l$_1$.

So long as $P_{me}>P_{atm}$ in the chamber of volume V, the voltage drop across the arc results in a vapor ionization sufficient for stable arcing and for reciprocating motion of the arc along the edge of the electrode without using any special means for increasing the ionization of the arc chamber. Such increasing the ionization occurs, for example, when using welding electrodes made with special additions of some elements added to stabilize arcing.

In this invention, the self protection of the welding bath melt and the stable arcing are provided by generating an excess of pressure of the metal vapor $P_{me}$ in the arc chamber of volume V with respect to atmospheric pressure $P_{atm}$ according to the following rule which is expressed in the formula:

$$P_{me} \geq (1.1 \text{ to } 2.0) P_{atm} \tag{1}$$

Based on this rule or formula (1), the minimum value of a specific power $q_2$, in W/cm$^2$, is calculated as follows:

$$q_2 = P_{me} \cdot C_0 \cdot G, \tag{2}$$

where $P_{me}$—pressure of vapor of the material of the metal electrode;

$C_0$—sonic speed in the material of the electrode;

G—Gruneisen non dimensional coefficient (G=1).

Figure 1:
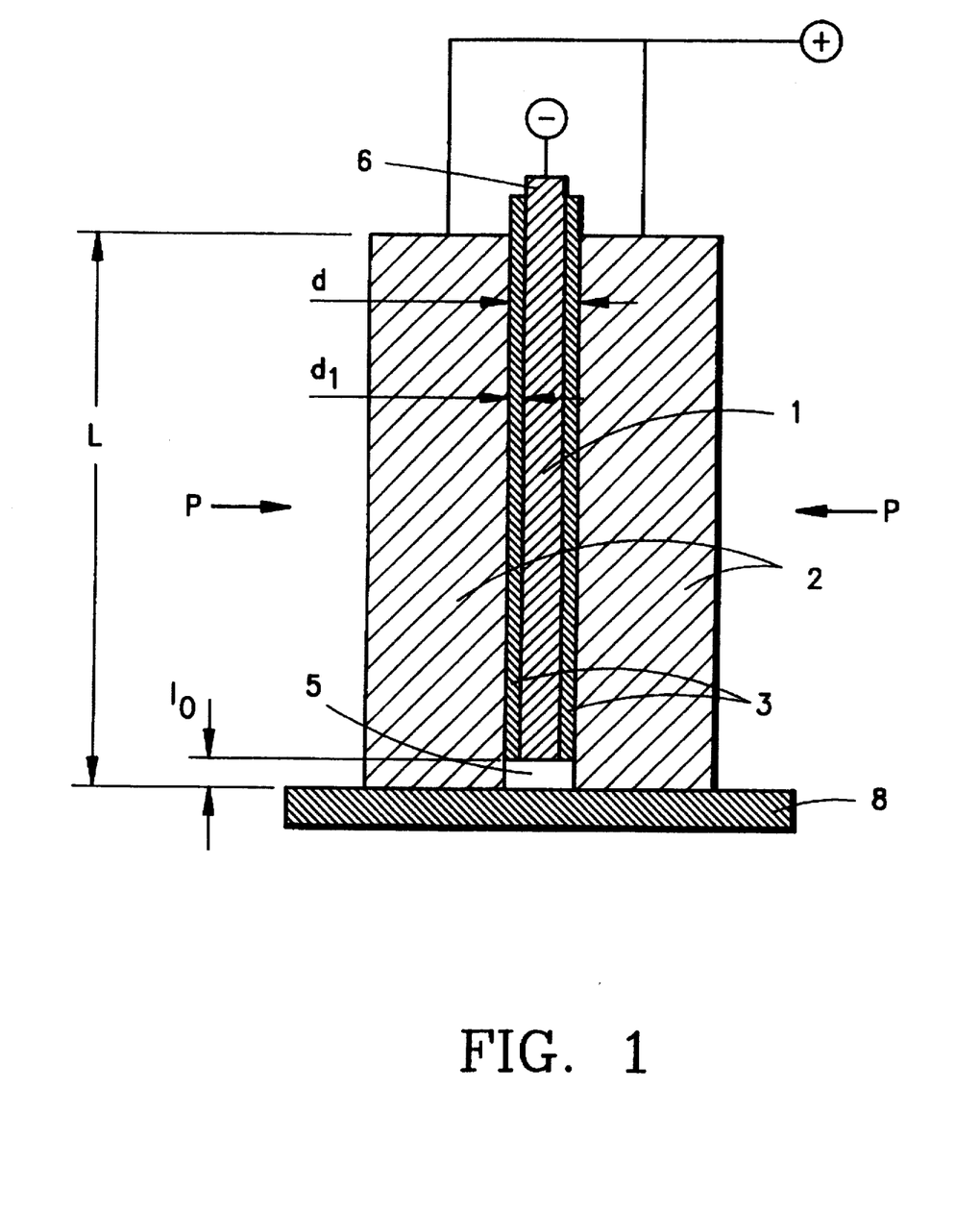
FIG. 1 is a two dimensional schematic view of an insulated stationary consumable electrode in an upright position clamped between two parts to be welded together. The parts are sitting on a plate whose purpose is to provide a chamber in which the arc is initiated and also to keep melted metal from leaking from the zone of the weld.
Figure 2:
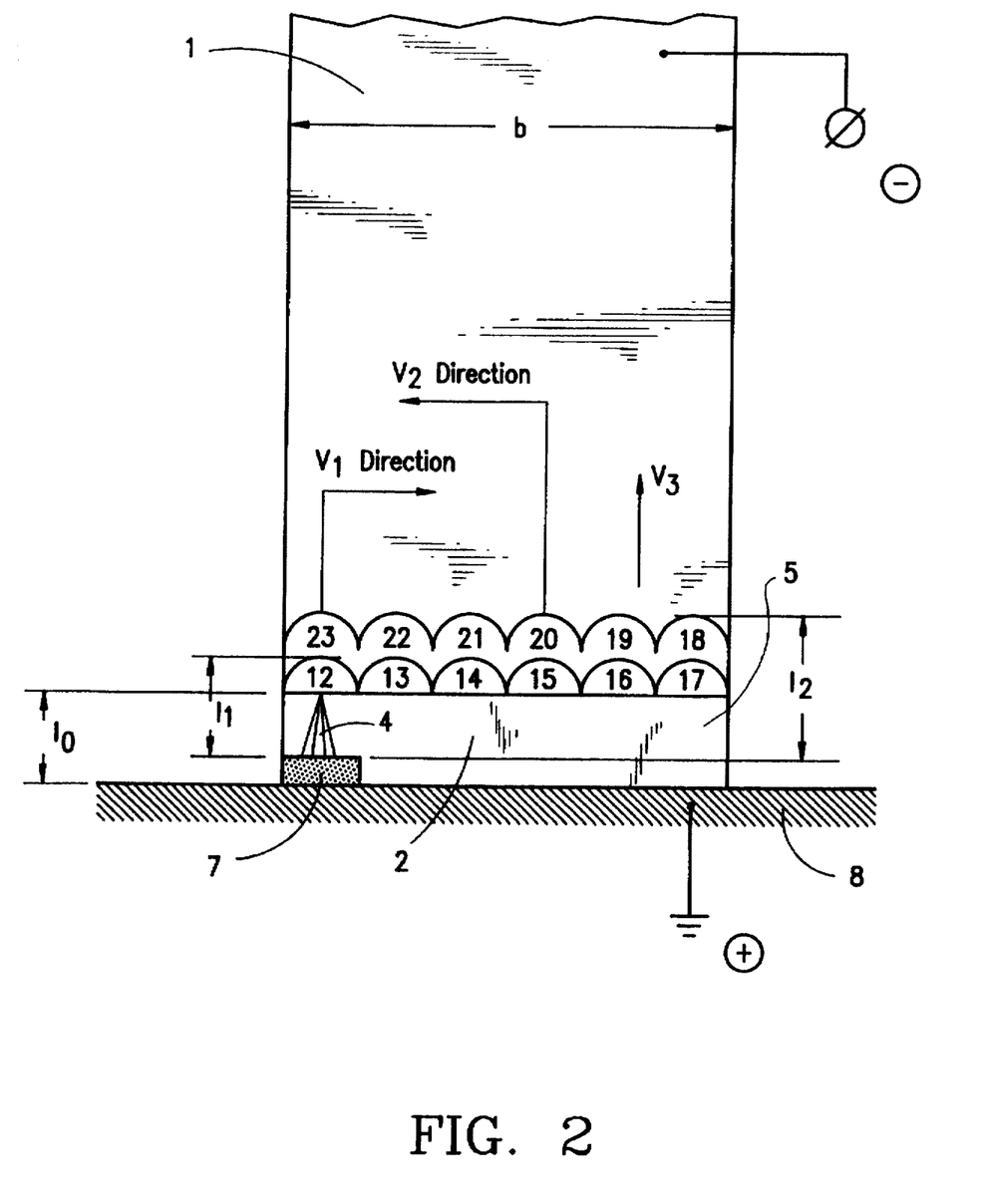

In accordance with this invention, welding power q, in W, is determined by taking into account the cross section area F of the insulated stationary consumable electrode (FIG. 1, 2) where $$F = d \cdot b, \tag{3}$$

and where d is the electrode's thickness and b is the electrode's width and is also the depth of the weld by the following formula:

$$q = q_2 \cdot F \tag{4}$$

A further condition for producing high quality welds when using self organizing, single pass arc welding as described in this invention is to fulfill the following rule indicated in formula:

$$\frac{v_3 \cdot F \cdot S_{me}}{q} = \text{from } 0.5 \text{ to } 0.8, \tag{5}$$

This rule defines thermal effectiveness of the welding process. In this formula, $V_3$—welding speed, i.e., the traverse speed of a b wide melting front along the length L of the parts to be welded together, in cm/s, as per $v_3$ on FIG. 2.

F—cross-section area in cm$^2$ of the end of the stationary consumable electrode as determined by the formula F=d·b (FIG. 1, 2);

$S_{me}$—heat content in J/cm$^3$ of the melted electrode, which is calculated by the formula $S_{me}=g(cT_{me}+L_{me})$, where in this formula g is the density of the electrode metal, in g/cm$^3$, c is the heat capacity of the electrode metal, in J/gK, $T_{me}$ is the melting point of the electrode material, in K, $L_{me}$ is the melting heat of the electrode material, in J/g;

q—welding power in W.

If the value of formula (5) is equal to 0.6 to 0.8 with the specific value depending on the material of the electrode, welds of the highest quality and without any defects are produced. Additionally, the minimum width of the heat affected zone and the minimum power consumption are achieved.

Achieving the range shown for formula (5) provides an increase in efficiency of the welding process. It results in a 10 to 15 times reduction of the energy consumption required to produce the weld using the method embodied in this invention as compared to, for example, open free burning arc welding with the use of covered electrodes.

In accordance with the rule expressed in formula (5), the selection of the welding regimes should be made by presetting the values of welding power q, welding speed $v_3$ and area F of the cross section of the consumable electrode, and by using the reference data with respect to determining the heat content $S_{me}$ of the melted electrode.

Many tests have proved that the present invention makes it possible to carry out welding of plates made of low-carbon steel and also plates of stainless steel dozens of times faster than the rate achieved with conventional welding methods.

For example, welding of plates made of low carbon steel of 200×100×10 mm dimensions was carried out at a speed as high as 40 m/h using a stationary 1 mm thick electrode made of stainless steel. In this case, the width of the weld was 2 mm and the width of the heat affected zone was 0.2 to 0.3 mm.

It has been found that alloyed steels are welded together even better than low carbon rimmed steels when using this method of welding. The best results have been achieved when welding plates as thick as 30 mm made of stainless austenitic steel using a 1.0 to 1.2 mm thick electrode of this same steel. In this case, the welds are as high in quality as those produced using electron-beam welding in vacuum.

An example: Welding was carried out using equipment with its voltage at idle run being 90 V and current as much as 1100 A. Welding of two plates made of low-carbon steel of 200×80×10 mm dimensions was carried out. The stationary consumable electrode was 200×80×1 mm and made of austenitic stainless steel. Insulation material 0.2 mm thick made of fine grained flux prepared with the use of sodium silicate solution was applied to the surface of the electrode.

According to rule or formula (1), the value of vapor pressure $P_{me}$ of the electrode material was $P_{me}$= $1.5 \cdot P_{atm} \cong 1.5 \cdot 10^6$·bar $\cong 0.15$ MPa.

In accordance with formula (2), specific power $q_2$ at sonic speed of $C_0 \cong 10^5$ cm/s and Gruneisen non dimensional coefficient G=1, taking into consideration formula (1), was equal to $$q_2 = P_{me} \cdot C_0/G \cong 1.5 \cdot 10^6 \cdot 10^5/1 = 1.5 \cdot 10^{11} \text{ erg/cm}^2 \cdot s = 1.5 \cdot 10^4 \text{ W/cm}^2$$

From formula (4), welding power q at the electrode thickness d=1 mm and the electrode width b=80 mm, and thus the electrode cross section area F=d·b=0.1·8=0.8 cm², was $$q = q_2 \cdot F = 1.5 \cdot 10^4 \cdot 0.8 = 1.2 \cdot 10^4 \text{ W} = 12 \text{ kW}.$$

Choosing the value of relation of parameters in formula (5) being equal to $$\frac{v_3 \cdot F \cdot S_{me}}{q} = 0.7,$$

the welding speed $v_3$ was determined with q and F calculated above and $S_{me}$ given by reference data. According to the latter, the value of $S_{me}$ for the stainless steel was equal to $9.76 \cdot 10^3$ J/cm³, when g=7.8 g/cm³, c=0.45 J/g·K, $T_{me}$= 1809K, $L_{me}$=272 J/g. Thus, $$v_3 = \frac{0.7 \cdot q}{F \cdot S_{me}} = \frac{0.7 \cdot 1.2 \cdot 10^4}{0.8 \cdot 9.76 \cdot 10^3} = 1.07 \cong 1.1 \text{ cm/s} = 38.7 \text{ m/h}.$$

The values of parameters of this welding regime measured on the welding equipment during welding were as follows: U=24V, I=500 A, welding time t=18.5 s.

Actual results achieved conformed with what the calculations performed according to the rules or formulae (1) through (5) indicated that they would be.

An analysis of five micro section metallographic specimens of the weld gave very satisfactory results. Neither porosity nor any other defects were found.

APPARATUS OF THE PRESENT INVENTION

The achieved objective of the present invention is an improved method of electric arc welding of metals. This is accomplished with the use of an insulated stationary consumable electrode fixed in any position in space (FIG. 1 to 5) and with standard equipment to produce improved quality welded joints. This new method improves quality of the welded joints, reduces defects in so welded joints and increases productivity of welding. This was accomplished by taking into account the values of the components included in formulae (1) through (5) and providing a specified amount of specific power over the entire weld's depth.

FIG. 1 shows a stationary insulated consumable electrode 1, positioned between the parts 2 to be welded together. The insulation of the electrode is identified as number 3. An insulated or uninsulated plate 8 is placed at the bottom of the parts 2 to prevent melted metal from leaking from the zone of the weld. If uninsulated, this plate becomes attached to the parts being welded together; if insulated, this plate does not become so attached. The consumable electrode 1 is placed between the parts 2 above the plate 8 creating a chamber or gap 5 between the parts 2 to be welded, the consumable electrode 1 and the plate 8. Number 6 identifies an overhang of the electrode which, as the electrode melts into the weld, fills the trough at the opposite end from where the weld is commenced which would otherwise be left when the weld is finished. Voltage is applied so that the stationary consumable electrode 1 is the cathode and the parts 2 to be welded and the support plate 8 the anode. This method also allows us to use an alternating current. $l_0$ is the distance between the plate 8 and the electrode 1 or the preset length of the arc. d is the thickness of the electrode including the thickness of insulation. The insulation's thickness is identified as $d_1$. L is the length of the parts to be welded together or the length of the weld. Letter P represents the small force used to clamp the parts 2 together with the electrode between them.

FIG. 2 is a cross-sectional side view showing the electrode 1 and underneath it the plate 8 after the arc 4 has been initiated in the zone 12 by having high voltage applied to the electrode 1 and to the parts 2 to be welded. Once the arc has been initiated, metal is transferred due to arcing from the electrode's zone 12 to zone 7 which is a bath of melted and solidifying metal, forming the weld. Numbers 12 to 16 represent the places to which the arc moves in a $v_1$ direction, as shown by the arrow, because the arc finds itself each time in a situation of $l_0 < l_1$ as shown on FIG. 2. The arc follows the path because of the synergetic principle of minimum of energy. At the electrode's edge, number 17, the arc will stop. Now the same principle of minimum of energy makes the arc move in the opposite $v_2$ direction, as shown by the arrow, because now $l_2 > l_1$, and the arc moves through the zones identified as numbers from 18 to the other edge, number 23. Thus, the above mentioned principle of minimum of energy makes the arc execute a reciprocating motion back and forth along the edge of the electrode until it melts it down. b is the width of the electrode and also the depth of the weld. The welding front moves up as shown by the upward facing arrow with the speed of the weld $v_3$.

Figure 3:
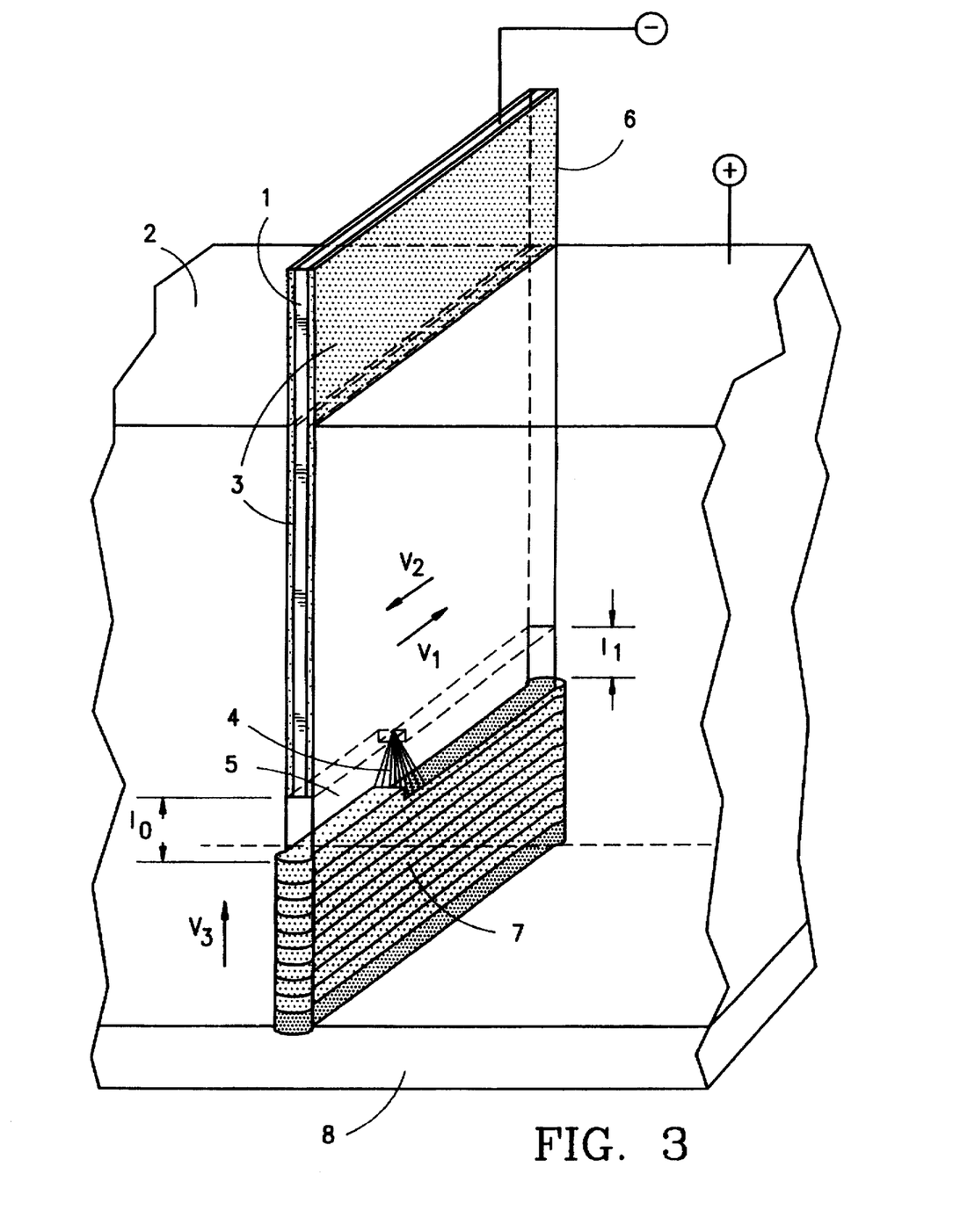
FIG. 3 is a three dimensional schematic view in which you are looking at a weld which has been partially completed. The chamber with the electrode's melt vapor and the arc inside has moved up the consumable electrode due to the arc's reciprocating along the electrode's end face. Below that chamber is completed weld.

FIG. 3 shows a three dimensions view of a certain moment of welding. Number 7 identifies the completed section of the weld. The moving vapor chamber across which the arc moves is identified as number 5.

Figure 4:
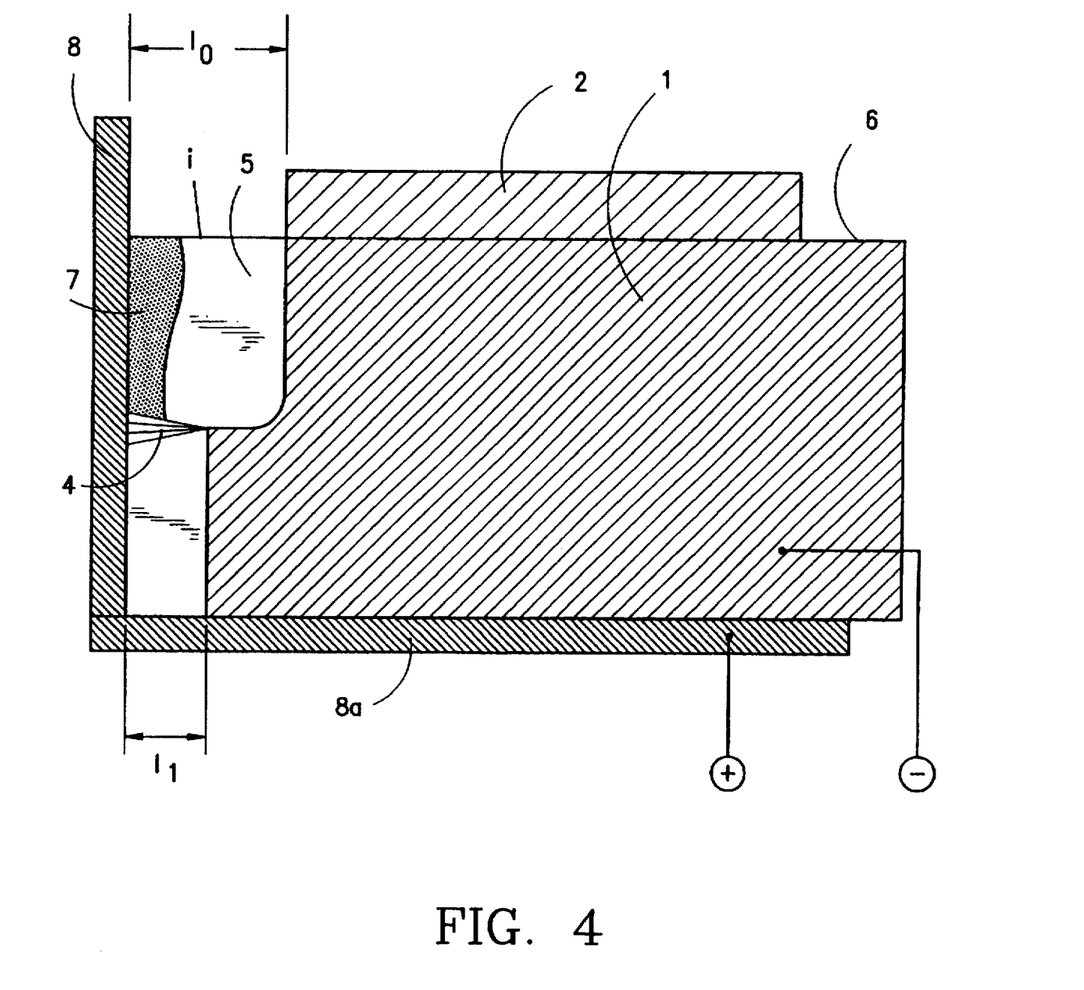
FIG. 4 is a two dimensional schematic view illustrating the electrode in the down position in accordance with the present invention. Because the plate mentioned in the description above of FIG. 1 is now perpendicular to the ground, an additional plate has been placed under the parts to keep the melt from leaking from the zone of the weld.

FIG. 4 shows welding with the insulated consumable electrode 1 in the down position. The arc 4 has been initiated at the electrode's edge i and moves to the position shown as 4. An additional plate 8a should be installed to prevent leaking of the melted metal.

Figure 5:
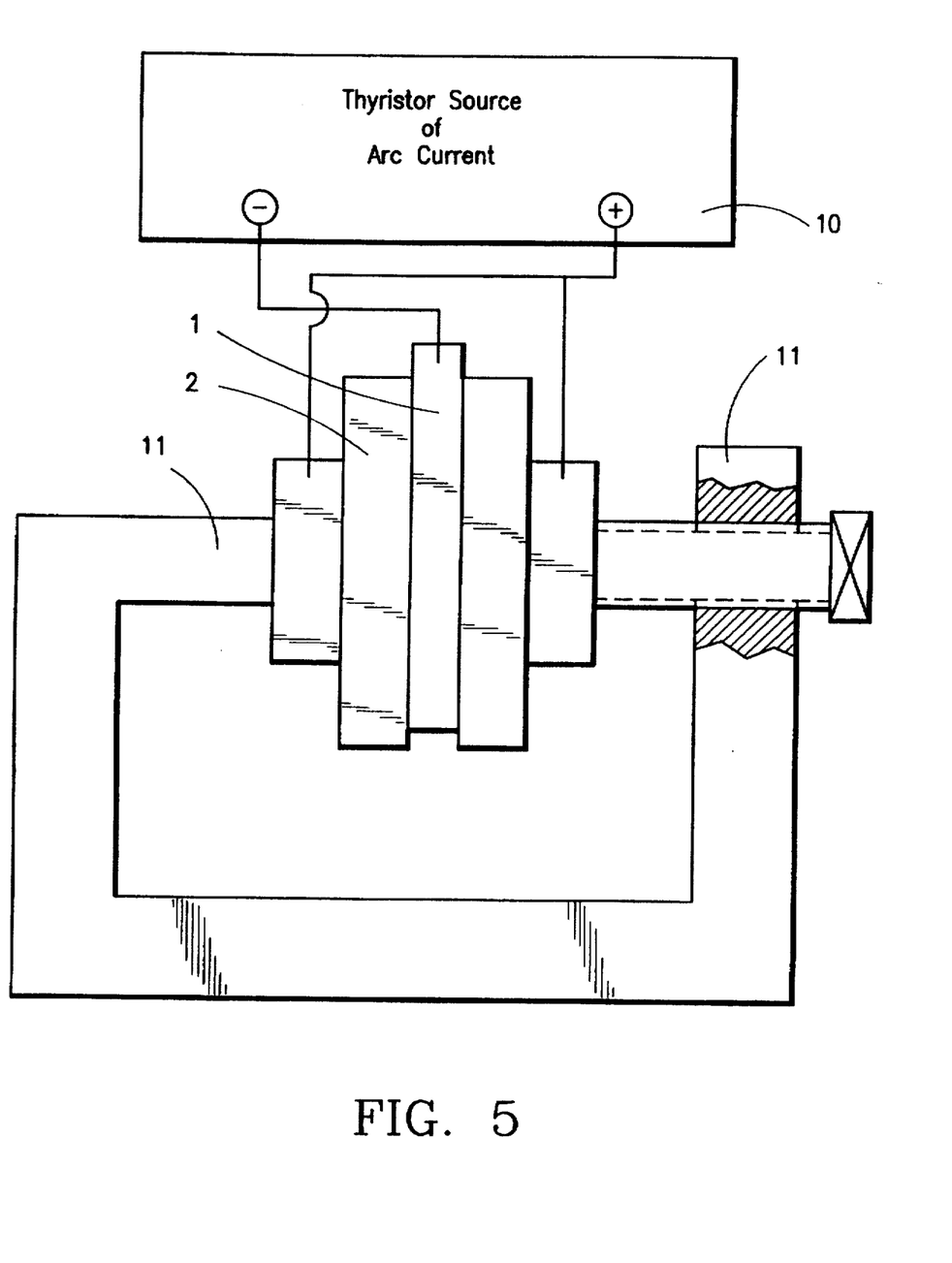
FIG. 5 is a two dimensional schematic view of the equipment used to carry out the welding method of the present invention.

FIG. 5 shows the equipment used for the implementation of this method of electric arc welding of considerably thick metals. It consists of the thyristor source of arc current 10 and of the clamping fixture 11 in which the parts 2 to be welded together are located with an insulated consumable stationary electrode 1 installed between them. The thyristor source of arc current 10 is provided with a controller for the welding current and a circuit for the phase control of the thyristors. The leads of the thyristor source of arc current 10 are connected to the stationary insulated consumable electrode 1 and to the parts 2 to be welded together.

The edges of the articles to be welded together do not have to be cut so that a "V" is formed at the touching edges of the article's parts to be welded together. The set up task is thus greatly simplified when compared to the traditional method of welding thick articles.

This invention represents a method of self organizing electric arc welding of metals with the use of an insulated stationary consumable electrode which is clamped between the parts of the article to be welded and involves a controlled feed of supply voltage to the insulated stationary consumable electrode and to the article's parts to be welded together. Each of the two faces of the electrode touching the surfaces of the article's parts to be welded together must mate with the face of the article's part that it faces.

The equipment, as shown in FIG. 5, used for the implementation of this method of electric arc welding of metals consists of clamping fixture 11 in which the article's parts 2 to be welded together are located with an insulated stationary consumable electrode 1 installed between them, a standard thyristor source of arc current 10 equipped with a controller of welding current and a circuit for the phase control of the thyristors, whose leads are connected to the insulated stationary consumable electrode 1 and the article's parts 2 to be welded together.

The method of electric arc welding of metals with the use of insulated stationary consumable electrodes in any position in space using the above described equipment is realized in the following manner:

As shown on FIG. 5, the article's parts 2 to be welded together are clamped together with an insulated stationary consumable electrode 1 between them in clamping fixture 11. Each face of the consumable electrode 1 should match as closely as possible the touching faces of the article's parts 2 being welded together so that as much face as possible of each of the parts 2 is touching the consumable electrode. A lead from one pole of the thyristor source of arc current 10 is connected to the insulated stationary consumable electrode 1 and leads from the other pole to the article's parts 2 to be welded together. To start welding, supply voltage is applied to the power thyristor unit and to the circuit for phase control of the thyristors in accordance with the rules or formulae (1) to (5).

It will be seen from the above that this self organizing process of single pass electric arc welding of considerably thick metals makes it possible to dramatically increase productivity, to reduce power consumption, and to improve weld quality. The main parameter that determines all the processes' nuances is a welding power as revealed in the formulae provided herein.

The scientifically determined selection of the value of power applied to the end face of the stationary consumable electrode in accordance with this invention protects the welding bath melt from air oxidation and thus improves the weld's quality when welding considerably thick metals in a single pass in a very oxidizing ambient atmosphere either in industrial or in field surroundings. This is achieved due to the excess of pressure of the metal vapor in the welding zone as related to the atmospheric pressure.

Simultaneously adjusted selection of welding power provides stable arcing and reciprocation of the arc along the electrode edge by controlling both the required amount of metal vapor generated and the rate of its ionization.

By taking into account the relation between the dimensions of the end of the electrode's cross section, the welding power, and the welding speed and the values of thermal constants of materials being welded together, the welding process described herein reduces power consumption 10 to 15 times and increases productivity 10 to 50 times as compared to conventional arc welding.

Although the description herein contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A method of, single pass arc welding of metals carried out in ambient air oxidizing surroundings with the use of an insulated stationary consumable electrode, the method comprising the steps of placing the electrode between the parts to be welded together and clamping them together, applying a voltage to the electrode and to both parts of the article to be welded together, and creating between the article and the electrode an arc current so that the welding power is sustained at a level which keeps the pressure of the metal vapor which arises due to vaporization of the electrode material in the welding zone higher than the ambient atmospheric air pressure.

2. A method according to claim 1 wherein the relation between the pressure $P_{me}$ of the metal vapor which arises by virtue of the electrode material vaporization in the welding zone and the atmosphere air pressure $P_{atm}$ is governed by the formula $P_{me} \geq (1.1-2.0) P_{atm}$ to provide proofing of the metal melt in the welding bath against air oxidation and interaction of the melt with air elements such as N, H, $H_2O$, etc.

3. A method according to claim 1, including the step of generating in the welding zone simultaneously with proofing of the metal melt against air oxidation, a required amount of the metal vapor of a wanted ionization extent to sustain the stable arcing and reciprocating motion of the arc along an edge of the electrode.

4. A method according to claims 3 including the step of pre-selecting the relation between the dimensions of the electrode cross section, the values of the welding power and the welding speed and thermal properties or constants of the materials to be welded together.

5. The method defined in claim 1 appiled to parts to be welded having flat surfaces and further including the step of using an electrode having opposite flat surfaces covered with insulation material and mating with the flat surfaces of the parts to be welded.

6. The method defined in claim 1 further including the step of: prior to initiating the welding process, forming an arc chamber in the welding zone for receiving the arc and the melted electrode portions.

7. The method defined in claim 6 wherein the arc chamber is formed by a barrier member which extends generally transversely of and engages the edges of the work pieces with the electrode being spaced from the barrier member.

8. The method defined in claim 7 wherein after the welding process is initiated the arc chamber is formed in part by the welded portions of the parts.

9. The method defined in claim 1 wherein the arc moves along the edge of the electrode back and forth while the edge recedes due to melting of the electrode.

10. Apparatus for single pass arc welding of metal parts carried out in ambient air oxidizing surroundings, comprising in combination, an insulated stationary consumable electrode to be placed between parts to be welded together, means for clamping the parts together with the electrode between the parts, means forming an arc chamber between the parts and the electrode, means for applying a voltage to the electrode and to both parts to produce an arc current so that the welding power is sustained at a level which keeps the metal vapor pressure $P_{me}$ in the arc chamber due to vaporization of the electrode material in the welding zone higher than the atmosphere air pressure $P_{atm}$ with a relation between them according to the rule $P_{me} \geq (1.1-2.0) P_{atm}$.

11. Apparatus defined in claim 10 wherein said means includes a thyristor source of arc current including means for controlling welding current and a circuit for controlling the phase of the thyristors.

12. Apparatus for arc welding of metal parts carried in ambient atmospheric conditions, the apparatus comprising in combination: an insulated consumable electrode having opposite surfaces to be placed between the parts with the surfaces of the electrode mating with the surfaces of the parts, means for fixing the parts together with the electrode positioned between the parts as recited above, means forming an arc chamber between the parts and the electrode along an edge of the electrode, means for applying a voltage to the electrode and to the parts to produce an arc current so that the welding power is sustained at a level which maintains a vapor pressure in the arc chamber due to vaporization of the electrode in the arc chamber higher than the ambient atmospheric pressure.

13. The apparatus defined in claim 12 wherein said means forming the arc chamber includes a barrier member placed transversely across and into engagement with the parts and in spaced relation to the electrode, and wherein after initiation of a welding process, the arc chamber is formed between the opposite surfaces of the parts, the edge of the electrode and the welded portions of the parts.

14. The apparatus defined in claim 12 wherein the opposite surfaces of the electrode are flat surfaces and further include insulated layers between the flat surfaces of the electrode and the parts.

* * * * *